July 16, 1957  J. W. MILLER  2,799,093
GAUGE FOR HANGING WINDOW SHADES
Filed Feb. 1, 1956
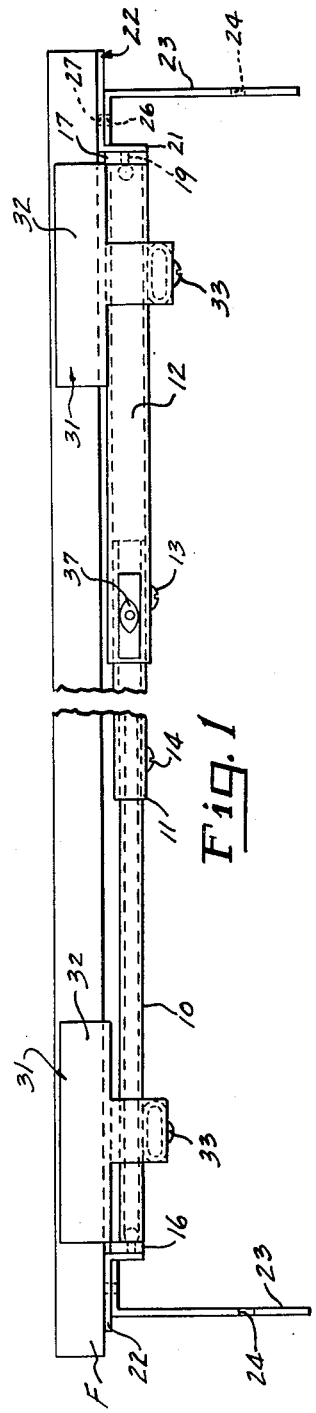
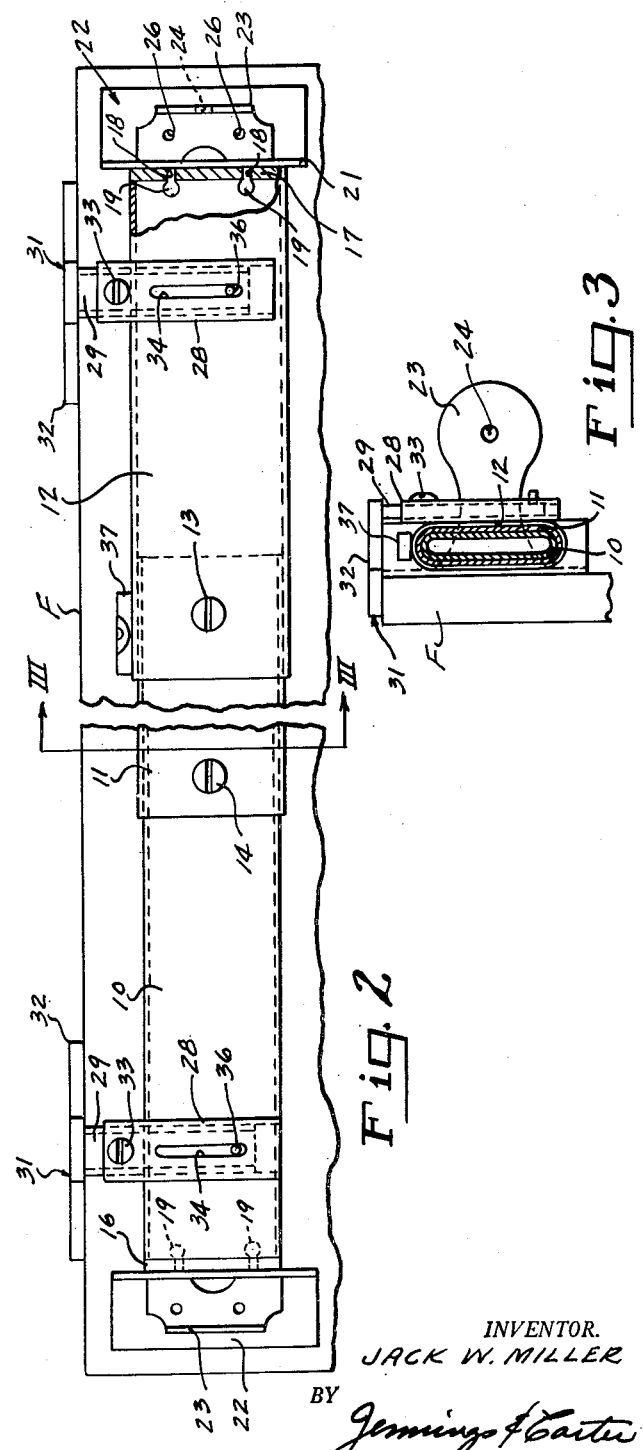
INVENTOR.
JACK W. MILLER
BY
Jennings & Carter
ATTORNEYS

United States Patent Office 2,799,093
Patented July 16, 1957

2,799,093

GAUGE FOR HANGING WINDOW SHADES

Jack W. Miller, Birmingham, Ala.

Application February 1, 1956, Serial No. 562,852

1 Claim. (Cl. 33—189)

This invention relates to a gauge for hanging window shades and the like and has for an object the provision of improved means for indicating the exact location of the supporting brackets for the shades.

Another object of my invention is to provide a gauge for hanging window shades and the like which shall be adjustable, thereby accommodating the gauge for use with different width shades.

A further object of my invention is to provide a gauge of the character designated which shall have removable brackets at the ends thereof, whereby the locations of different size shade supporting brackets may be indicated.

A further object of my invention is to provide a gauge of the character designated which shall include improved means for leveling and maintaining the same in level position.

A still further object of my invention is to provide a gauge of the character designated which shall be simple of construction, economical of manufacture and one which affords means whereby the erection of window shades may be done in a minimum of time.

As is well known in the art to which my invention relates, the hanging of window shades, particularly where a large number are to be hung, the task of marking the places for the supporting brackets on the window frame, is a very tedious task. Not only is it difficult to obtain the proper distance between the supporting brackets, but it is also difficult to position the supporting brackets in the same horizontal plane.

To overcome the above and other difficulties, I provide a gauge comprising telescoping members which are secured in selected positions relative to each other. Brackets are mounted adjacent the outer ends of the telescoping members in position to receive the spindles of the shade to be mounted. Also, suitable openings are provided in the brackets for inserting a marking tool whereby the locations of the supporting brackets for the shade are indicated.

A device embodying features of my invention is illustrated in the accompanying drawings, forming a part of this application, in which:

Fig. 1 is a plan view of the device;

Fig. 2 is a front elevational view thereof; and,

Fig. 3 is a sectional view taken along the line III—III of Fig. 2.

Referring now to the drawings for a better understanding of my invention, I show elongated telescoping members 10, 11 and 12, the section 12 telescoping over the section 11 and the section 11 telescoping over the section 10. A set screw 13 holds the sections 11 and 12 in selected positions relative to each other and a set screw 14 holds the sections 10 and 11 in selected positions relative to each other. The outer ends of the sections 10 and 12 are provided with end walls 16 and 17, respectively. Each of the end walls 16 and 17 is provided with suitable openings 18 for receiving protuberances 19 mounted on a leg 21 of an L-shaped bracket 22.

Preferably, the ends of the protuberances 19 are slightly enlarged and are formed of a spring-like material so that they snap within the openings 18, as shown, whereby the brackets 22 are held in place.

Secured to the L-shaped bracket 22 is a second L-shaped bracket 23 which corresponds generally to the size and shape of the supporting bracket for the shade to be mounted. That is, each bracket 23 is provided with an opening or slot 24 for receiving the spindle at the adjacent end of the shade to be hung and is provided with openings 26 which correspond to the openings in the shade supporting brackets for receiving suitable attaching screws or nails. As is well known, one shade supporting bracket is provided with an opening for receiving one shade spindle while the other is provided with an open ended slot for receiving the other spindle of the shades. As shown in Fig. 1, each bracket 22 is provided with an opening 27 which is in alignment with the openings 26 whereby a suitable marking tool, such as a punch or pencil, may be inserted to indicate the exact position of the screws or nails for the supporting bracket to be mounted.

Mounted on each of the telescoping sections 10 and 12 is an upstanding guide member 28, which is preferably in the form of a tubular member. Telescoping within the guide member 28 is a vertical leg 29 of an L-shaped bracket 31. The leg 29 forms a support member for the horizontal leg 32 of the bracket 31 which extends over the top of the window frame, indicated generally at F. A set screw 33 extends through the guide member 28 and engages the vertical leg or support member 29 whereby the brackets 31 are held in selected vertical positions relative to the guide members 28 and the telescoping members 10, 11 and 12. To limit vertical movement of the support member 29 relative to the guide member 28, a vertical slot 34 is provided in the guide member and an outwardly projecting detent 36 is secured to the support member 29 in position to project through the slot 34, as clearly shown in Fig. 2.

Mounted adjacent the innermost end of the telescoping section 12 is a suitable level, such as a spirit type level 37, which indicates the horizontal position of the telescoping sections.

From the foregoing description, the operation of my improved gauge will be readily understood. The device is laid flat on a suitable supporting surface, such as the floor or a table, and the set screws 13 and 14 are released whereby the sections 10, 11 and 12 may be moved relative to each other to obtain the proper space between the brackets 23. This is accomplished by inserting the spindles of the shade to be mounted in the openings or slots 24 and then clamping the set screws 13 and 14 in place.

With the length thus adjusted, the shade is removed and the device is held up to the window frame F with the brackets 31 overhanging the frame. The height and horizontal position of the telescoping sections is then adjusted by loosening the set screws 33 and moving the support members 29 until the level 37 indicates that the telescoping sections are in proper horizontal alignment. The set screws 33 are then tightened, whereby the device is supported by the brackets 31. A suitable marking tool, such as a punch or pencil, is inserted through the aligned openings 26 and 27 in the brackets 23 and 22, respectively, thereby indicating the exact positions for the screws which support the shade brackets. The supporting brackets for the shade are then ready to mount. With the device thus adjusted, the device can then be used by going from window to window and marking the holes for the supporting brackets.

In order to accommodate the device for different size brackets 23, the bracket 22 may be removed from the end walls 16 and 17 and a bracket 22 carrying a different size bracket 23 can be readily installed by inserting the protuberances 19 thereof through the openings 18 in the manner described heretofore.

From the foregoing it will be seen that I have devised an improved gauge for mounting window shades which is simple of construction and operation and which may be readily employed in mounting shades of different sizes. By providing means for indicating both the horizontal and the vertical position of the supporting brackets, together with means for supporting the device while the marking tool is employed, the shades may be easily mounted by one person.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim:

In a gauge for hanging window shades having spindles at the ends thereof adapted to engage shade supporting brackets, elongated telescoping members, means securing said telescoping members in selected positions relative to each other, L-shaped brackets mounted adjacent the outer ends of said telescoping members with one leg thereof adapted to receive and support the spindles of a shade, outwardly projecting protuberances mounted on the other leg of said brackets, there being openings in the ends of the telescoping members for receiving the protuberances, there being openings through said brackets for inserting a marking tool whereby the locations of the shade supporting brackets are indicated, upstanding guide members mounted on said telescoping members, vertical support members mounted for sliding movement relative to said guide members, means locking said support members in selected positions relative to said guide members, and horizontal legs secured to the upper ends of said support members and adapted to overlie a window frame.

References Cited in the file of this patent
UNITED STATES PATENTS

| | | |
|---|---|---|
| 371,975 | Rhodes | Oct. 25, 1887 |
| 408,496 | Macker | Aug. 6, 1889 |
| 627,112 | Gross | June 20, 1899 |
| 1,121,290 | Robinson | Dec. 15, 1914 |
| 2,060,927 | Cristiani | Nov. 17, 1936 |